United States Patent [19]

Noble, Sr.

[11] Patent Number: 4,837,911

[45] Date of Patent: Jun. 13, 1989

[54] METHOD OF ASSEMBLING AND TRANSPORTING VEHICLE WHEEL ASSEMBLIES IN A SEQUENTIAL ORDER

[75] Inventor: William L. Noble, Sr., Village of Wolverine Lake, Mich.

[73] Assignee: Chrysler Motors Corportion, Highland Park, Mich.

[21] Appl. No.: 285,686

[22] Filed: Dec. 16, 1988

[51] Int. Cl.$^4$ .................. B65G 13/02; B65G 67/00
[52] U.S. Cl. .................. 29/159.1; 414/398; 414/529; 414/786
[58] Field of Search ............ 29/159.1; 414/398, 529, 414/527, 507, 786

[56] References Cited

U.S. PATENT DOCUMENTS

| | | | |
|---|---|---|---|
| 2,204,828 | 6/1940 | Sherrill | 414/398 |
| 2,335,516 | 11/1943 | Koonce | 414/786 |
| 3,987,915 | 10/1976 | Conner | 414/786 |
| 4,304,521 | 12/1981 | Hammond | 414/786 |

FOREIGN PATENT DOCUMENTS 0051617  4/1977  Japan ................. 414/398

Primary Examiner—P. W. Echols
Assistant Examiner—Kevin Jordan
Attorney, Agent, or Firm—Edward A. Craig

[57] ABSTRACT

The invention is concerned with a method of assembling vehicle wheels at a location remote from a vehicle assembly plant in a predetermined sequence for transport to the vehicle assembly plant for unloading in the same predetermined sequence. Seats of vehicle wheels, which may include wheel rims and tires of various sizes and types, are assembled at the remote location in the predetermined sequence. These wheel assemblies are then loaded in the same sequence onto a highway cargo trailer and transported to the vehicle assembly plant for unloading in the predetermined sequence.

3 Claims, 3 Drawing Sheets

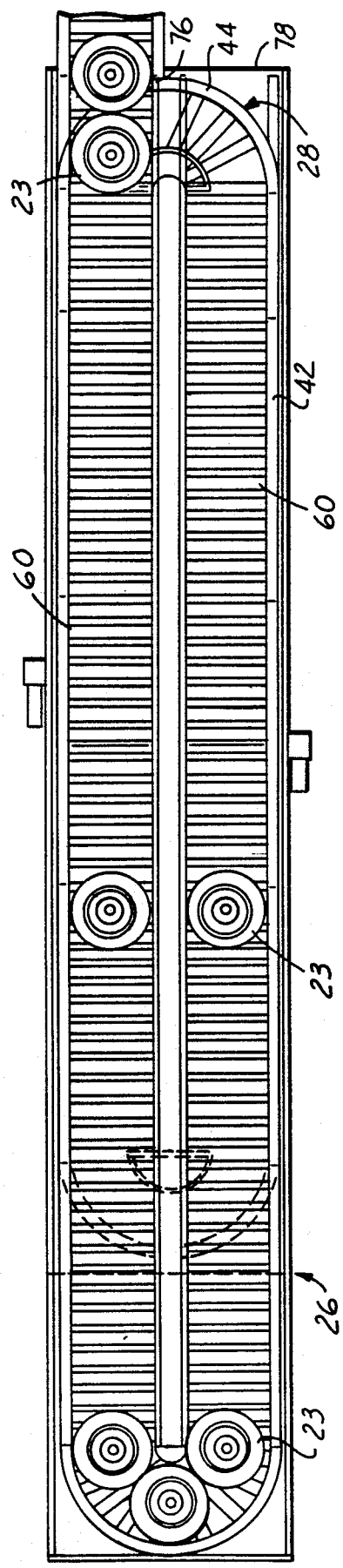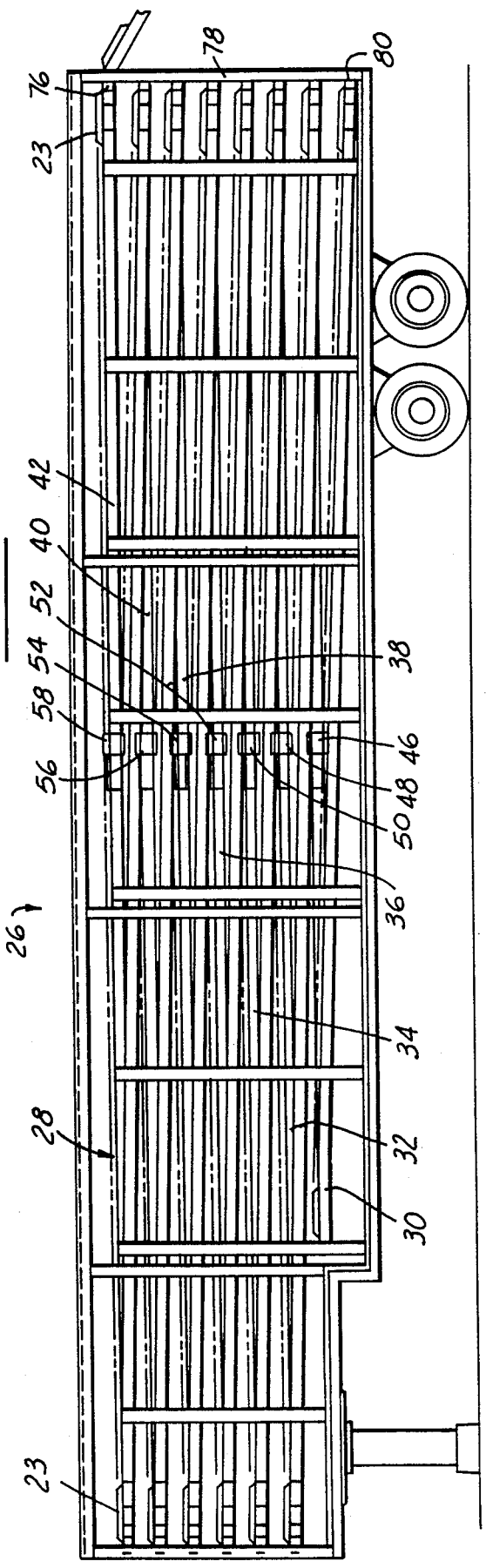

METHOD OF ASSEMBLING AND TRANSPORTING VEHICLE WHEEL ASSEMBLIES IN A SEQUENTIAL ORDER

BACKGROUND OF THE INVENTION

1. Field of the Invention:

This invention relates to a method for assembling vehicle wheels at a location remote from a vehicle assembly plant for transport to the vehicle assembly plant in a sequential order.

2. Description of the Prior Art:

Automotive vehicles are conventionally assembled from component parts in large plants referred to as "assembly plants". Typically, in such assembly plants, the accepted practice for mass producing vehicles is to use a continuously moving assembly line attended by operators, each of whom is assigned a specific task or tasks to complete on each vehicle. In general, the assembly line may be divided into five basic areas which include body, paint, chassis, trim and final assembly operations.

Manufacturers of mass produced vehicles, both cars and light trucks, constantly strive to reduce the cost of manufacture while at the same time increase the quality of the product. The increased complexity of vehicles has made this job more difficult than it was in the past. One technique which is currently being employed to improve vehicle assembly operations is to reduce the amount of component assembly which takes place in a vehicle assembly plant. For example, instrument panel components may be assembled at one location and shipped to a vehicle assembly plant fully assembled for direct installation on a vehicle. The present invention concerns itself with assembly of wheels at a location remote from a vehicle assembly plant for trans-shipment to the vehicle assembly plant for direct mounting on a vehicle.

A vehicle wheel assembly includes the wheel rim with tire mounted thereon, the tire being inflated and the wheel balanced. This assembly may be directly mounted on a vehicle. In the past, wheel assemblies have been completed at the vehicle assembly plant. This requires that the assembly plant provide a separate space for storage of various sizes and styles of wheel rims and tires as well as space for equipment and wheel assembly activity. In addition to the space requirements, the assembly of wheels adds to the complication of operating a vehicle assembly plant.

In accordance with the present invention, a method is provided for assembling wheels at a location remote from the vehicle assembly plant. The method includes the steps of loading assembled wheels onto a highway cargo trailer in a sequential order which matches the sequence in which specific vehicles are to be assembled at the vehicle assembly plant. Consequently, when the wheel assemblies are unloaded from the trailer, sets of wheel assemblies are unloaded in a sequence which matches the sequence of vehicle assembly. This eliminates the necessity for rummaging through a load of wheel assemblies in an effort to locate the particular set of wheels which are destined for a particular vehicle.

SUMMARY OF THE INVENTION

A method for assembling vehicle wheels at a location remote from a vehicle assembly plant for transport to a vehicle assembly plant in a pre-determined sequential relationship is provided. The method includes the steps of providing a supply of vehicle wheel rims and tires of various sizes and types at a location remote from a vehicle assembly plant. The method further includes the step of mounting designated tires on designed wheel rims to form vehicle wheel assemblies in accordance with a predetermined sequence dictated by the order of use at the vehicle assembly plant. The tires are then inflated in the predetermined sequence and the wheel assemblies are then balanced in the same predetermined sequence.

A highway cargo trailer is provided having there within a conveyer in the form of a plurality of interconnected vertically spaced apart tiers. A conveyer inlet is provided at one of the uppermost and lowermost tiers, preferably the uppermost tier. A conveyer outlet is provided at the other of the uppermost and lowermost tiers, preferably the lowermost tier.

The vehicle wheel assemblies are then loaded onto the trailer conveyer via the conveyer inlet in the aforesaid predetermined sequence to thereby permit unloading of the wheel assemblies from the trailer conveyer via the conveyer outlet in the predetermined sequence at the vehicle assembly plant after the highway cargo trailer has been transported to the vehicle assembly plant. Preferably, both the trailer conveyer inlet and outlet are provided at the rear end of the highway cargo trailer.

BRIEF DESCRIPTION OF THE DRAWINGS

FIG. 2 is a top plan view of a highway cargo trailer, with the top removed, employed in the method of the present invention;

FIG. 3 is a side elevational view, with the side removed, of the highway cargo trailer of FIG. 2.

DETAILED DESCRIPTION OF A PREFERRED EMBODIMENT

Figure 1:
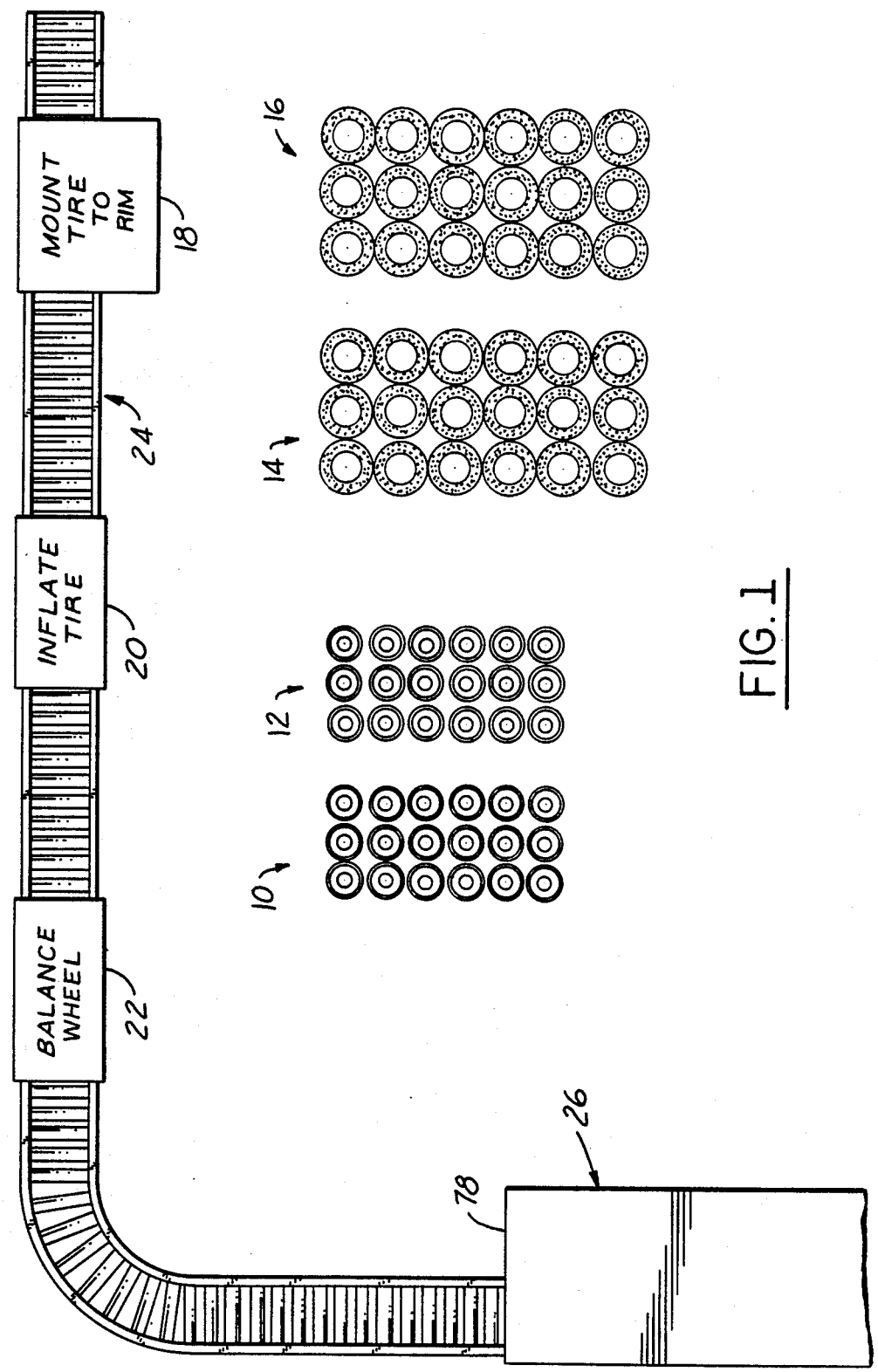
FIG. 1 is a diagrammatic view of an assembly area for vehicle wheels where the method of the present invention is employed.

Referring to FIG. 1, it will be noted that an assembly area is diagrammatically illustrated. This area may be any suitable location remote from a vehicle assembly plant. As will be appreciated, the wheel assembly location may serve more than one vehicle assembly plant as necessary. Space is provided for storage of vehicle wheel rims and tires. Representatively, two stacks of wheel rims 10 and 12 are provided as well as two stacks of tires 14 and 16, thus representing different tire and wheel rim sizes and types. As is well known, wheel rims vary in both size and style for use on the same vehicle. The same is true for tires. In the build of a vehicle, whether it be an automobile or light truck, a particular style and size is designated for that particular vehicle. It is necessary to be able to accommodate these differences in vehicle build. Further, a vehicle assembly plant may be used to assemble a mixed variety of cars, each of which may require different vehicle wheels.

As illustrated, three stations 18, 20, 22 are provided for assembling the wheels. These stations are interconnected by means of a conveyer 24 so that the wheels in various states of assembly may be easily moved from one station to the other. The tires are mounted on the wheel rims at station 18, the tires are inflated at station 20, and the wheel assembly is balanced at station 22. This completes the assembly of a wheel 23 which is then ready for installation on a vehicle. The equipment used at each station is conventional.

As will be appreciated, each vehicle has at least four wheels 23. In some vehicle builds, a fifth wheel will be provided as a spare. Further, in some light truck assemblies, dual wheels are provided on the rear axle, thus necessitating six wheels instead of the usual four. Each of these requirements are taken into account for each set of wheels.

The sets of wheels 23 are assembled in accordance with a predetermined sequence dictated by the order of use at the vehicle assembly plant. This information is provided at the wheel assembly location by any conventional means. A printed schedule may be physically delivered to the wheel assembly location or the sequence may be a running sequence conveyed as by means of electronic communications. Alterations may, of course, be made in the sequence as necessary. Sets of wheels may be removed or added as needed.

After the wheels 23 are assembled, they are loaded onto a highway cargo trailer 26. This loading is done in the same predetermined sequence as previously described.

Figure 4:
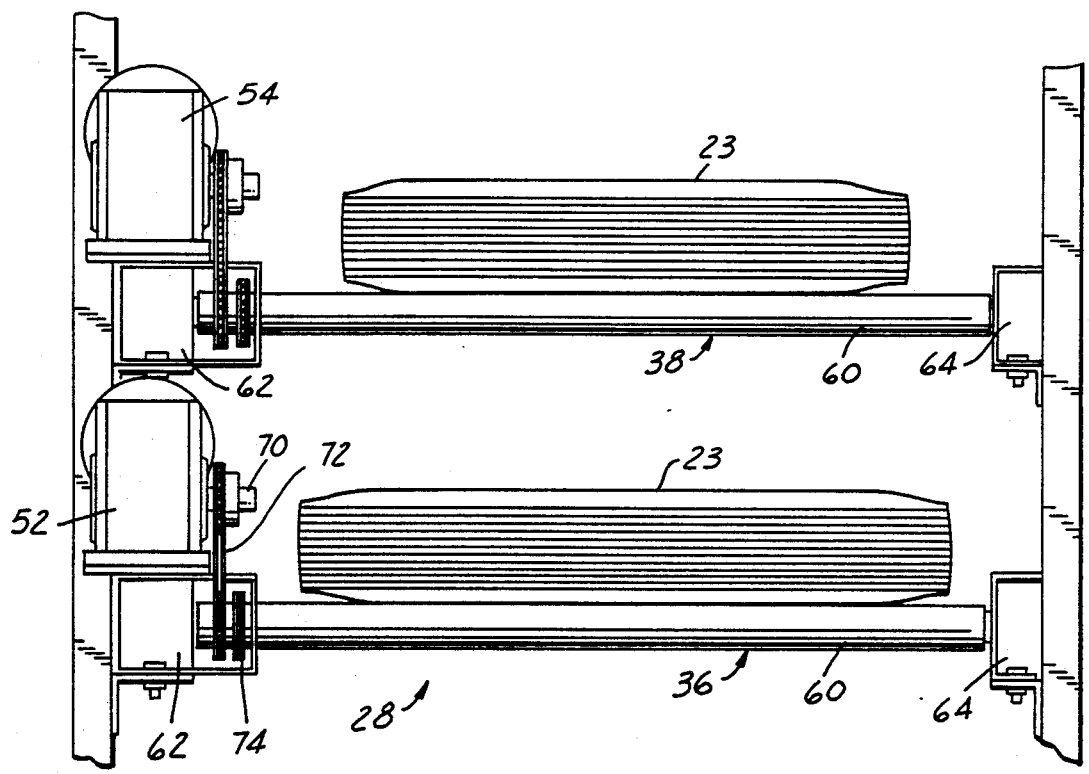
FIG. 4 is a fragmentary end view of two tiers of the conveyer used in the highway cargo trailer in accordance with the method of the present invention.

Referring to FIGS. 2, 3 and 4, it will be noted that the trailer 26 has therewithin a trailer conveyer 28 in the form a plurality of interconnected vertically spaced apart tiers 30, 32, 34, 36, 38, 40, 42, thus numbering seven in the illustration shown. As shown in FIG. 2, each tier is interconnected by a curved portion 44 to thus form a continuous conveyer.

The conveyer is of the powered type and has two motors for each tier. Thus, as will be noted in FIG. 3, seven motors 46, 48, 50, 52, 54, 56, 58 are provided on one side of the trailer 26. Seven additional motors are provided on the other side of the trailer. The motors are, illustratively, electric motors. However, fluid driven motors such as pneumatic motors, may be used as desired.

Referring to FIG. 4, it will be noted that the conveyer 28 is of the roller type, being comprised of a plurality of spaced apart rollers 60. Each roller 60 is suitably journaled in bearing structures 62, 64. Each motor has an output shaft 70 which is drivingly connected to a sprocket on a roller 60 by means of a chain 72. This roller is thus power driven. There is a chain and sprocket structure 74 between the sets of rollers so that all of the rollers are power driven.

A conveyer inlet 76 is preferably provided on the uppermost tier 42 at the rear 78 of the trailer 26. A conveyer outlet 80 is preferably provided at the rear 78 of the trailer on the lowermost tier 30. Thus, wheel assemblies 23 are loaded at the top of the trailer and move towards the bottom of the trailer for unloading at the conveyer outlet 80.

Wheel assemblies 23 are loaded onto the conveyer 28 by means of an upwardly inclined conveyer section 82 of conveyer 24.

As will be appreciated, after the highway cargo trailer 26 is loaded, it is pulled by means of a truck tractor from the vehicle wheel assembly location to a vehicle assembly plant for unloading. The sets of wheel assemblies 23 are unloaded via the outlet 80 of the conveyer 28 in the same predetermined sequence as they were loaded onto the trailer 26 to thereby permit the proper set of wheels 23 to be unloaded in the sequence of vehicle assembly as desired.

I claim:

1. A method for assembling vehicle wheels at a location remote from a vehicle assembly plant for transport to the vehicle assembly plant comprising the steps of:
   a. providing a supply of vehicle wheel rims and tires of various sizes and types at a location remote from a vehicle assembly plant,
   b. mounting designated tires on designated wheel rims to form vehicle wheel assemblies in accordance with a predetermined sequence dictated by the order of use at the vehicle assembly plant,
   c. inflating the tires of the thus formed vehicle wheel assemblies in said predetermined sequence,
   d. then balancing the vehicle wheel assemblies in said predetermined sequence,
   e. providing a highway cargo trailer having therewithin a conveyer in the form of a plurality of interconnected vertically spaced apart tiers,
   f. providing a conveyer inlet at one of the uppermost or lowermost tiers,
   g. providing a conveyer outlet at the other of the uppermost and lowermost tiers,
   h. and then loading the vehicle wheel assemblies onto the conveyer via the conveyer inlet in said predetermined sequence to thereby permit unloading of the wheel assemblies from the conveyer via the conveyer outlet in said predetermined sequence at the vehicle assembly plant after the highway cargo trailer has been transported to the vehicle assembly plant.

2. The method as defined in claim 1, further characterized in the step of providing the conveyer inlet in the uppermost conveyer tier and the conveyer outlet on the lowermost conveyer tier so that balanced vehicle wheel assemblies are moved on the conveyer from the uppermost conveyer tier to the lowermost conveyer tier for unloading.

3. The method as defined in claim 2, further characterized in the step of providing both the conveyer inlet and outlet at the rear end of the highway cargo trailer.

* * * * *